US012598288B2

(12) United States Patent
Wu et al.

(10) Patent No.: US 12,598,288 B2
(45) Date of Patent: Apr. 7, 2026

(54) METHOD AND DEVICE FOR DETECTING POWER STABILITY OF IMAGE SENSOR

(71) Applicant: ASUSTeK COMPUTER INC., Taipei City (TW)

(72) Inventors: Chen-Jeh Wu, Taipei City (TW); Hsiu-Ting Yang, Taipei City (TW); Chun-Hao Liao, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 265 days.

(21) Appl. No.: 18/469,569

(22) Filed: Sep. 19, 2023

(65) Prior Publication Data

US 2024/0223746 A1      Jul. 4, 2024

(30) Foreign Application Priority Data

Dec. 28, 2022     (TW) .................................. 111150367

(51) Int. Cl.
| | |
|---|---|
| *H04N 17/00* | (2006.01) |
| *G06T 7/00* | (2017.01) |
| *H04N 23/65* | (2023.01) |

(52) U.S. Cl.
CPC ......... *H04N 17/002* (2013.01); *G06T 7/0002* (2013.01); *H04N 23/65* (2023.01); *G06T 2207/30168* (2013.01)

(58) Field of Classification Search
CPC .... H04N 17/002; H04N 23/65; G06T 7/0002; G06T 2207/30168
USPC ........................................................ 348/187
See application file for complete search history.

(56) References Cited

U.S. PATENT DOCUMENTS

| | | | |
|---|---|---|---|
| 6,839,088 B2* | 1/2005 | Dicarlo .................. | G01N 21/55 |
| | | | 348/370 |
| 9,412,039 B2* | 8/2016 | Hong ...................... | H04N 23/81 |
| 12,013,628 B2* | 6/2024 | Song ....................... | G03B 43/00 |

FOREIGN PATENT DOCUMENTS

| | | |
|---|---|---|
| CN | 104104842 | 8/2017 |
| CN | 110730280 | 8/2021 |

* cited by examiner

*Primary Examiner* — Trang U Tran
(74) *Attorney, Agent, or Firm* — JCIPRNET

(57) ABSTRACT

A method and a device for detecting power stability of an image sensor are provided. The method includes: providing first power by a power supply circuit to the image sensor based on a first electronic configuration; during a period that the image sensor is driven by the first power, capturing at least one first test image by the image sensor; analyzing image content of the first test image to obtain first noise distribution information of the first test image; and generating a first evaluation information corresponding to the first electronic configuration according to the first noise distribution information.

18 Claims, 6 Drawing Sheets

11 — Power supply circuit

12 — Image sensor

14 — Processor

13 — Storage circuit

10

Image ~31

Convert

--32

| P(11) | P(12) | • • • | P(1n) |
|-------|-------|-------|-------|
| P(21) | P(22) | • • • | P(2n) |
| ⋮ | ⋮ | • • • | ⋮ |
| P(m1) | P(m2) | • • • | P(mn) |

FIG. 3

METHOD AND DEVICE FOR DETECTING POWER STABILITY OF IMAGE SENSOR

CROSS-REFERENCE TO RELATED APPLICATION

This application claims the priority benefit of Taiwan application serial no. 111150367, filed on Dec. 28, 2022. The entirety of the above-mentioned patent application is hereby incorporated by reference herein and made a part of this specification.

BACKGROUND

Technical Field

The disclosure relates to a method and a device for detecting power stability of an image sensor.

Description of Related Art

As the image recognition technology is getting more and more advanced, how to improve the quality of the image captured by the image sensor is also more important. In general, in addition to improving the quality of the lens or sensor used in the image sensor, improving the stability of the power supply used to drive the image sensor is also an important issue. Once the stability of the power supply used to drive the image sensor is not good, the image captured by the image sensor is prone to irregular noise.

SUMMARY

This disclosure provides a method for detecting power stability of an image sensor, which includes the following operation. First power is provided by a power supply circuit to the image sensor based on a first electronic configuration. At least one first test image is captured by the image sensor during a period that the image sensor is driven by the first power. Image content of the at least one first test image is analyzed to obtain first noise distribution information of the at least one first test image. First evaluation information corresponding to the first electronic configuration is generated according to the first noise distribution information.

This disclosure further provides a device for detecting power stability of an image sensor, which includes a power supply circuit, an image sensor, and a processor. The image sensor is coupled to the power supply circuit. The processor is coupled to the image sensor. The power supply circuit is used to provide a first power to the image sensor based on a first electronic configuration. The processor is used for the following operation. At least one first test image is captured by the image sensor during a period that the image sensor is driven by the first power. An image content of the at least one first test image is analyzed to obtain first noise distribution information of the at least one first test image. First evaluation information corresponding to the first electronic configuration is generated according to the first noise distribution information.

Based on the above, after the power supply circuit provides the first power to the image sensor based on the first electronic configuration, during the period that the image sensor is driven by the first power, the image content of the first test image captured by the image sensor may be analyzed to obtain the first noise distribution information of the first test image. Thereafter, first evaluation information corresponding to the first electronic configuration may be generated according to the first noise distribution information. Thereby, the efficiency of detecting the stability of the power supplied to the image sensor may be effectively improved.

BRIEF DESCRIPTION OF THE DRAWINGS

FIG. 3 is a schematic diagram of converting a test image into a grayscale image according to an embodiment of the disclosure.

DETAILED DESCRIPTION OF DISCLOSED EMBODIMENTS

Figure 1:
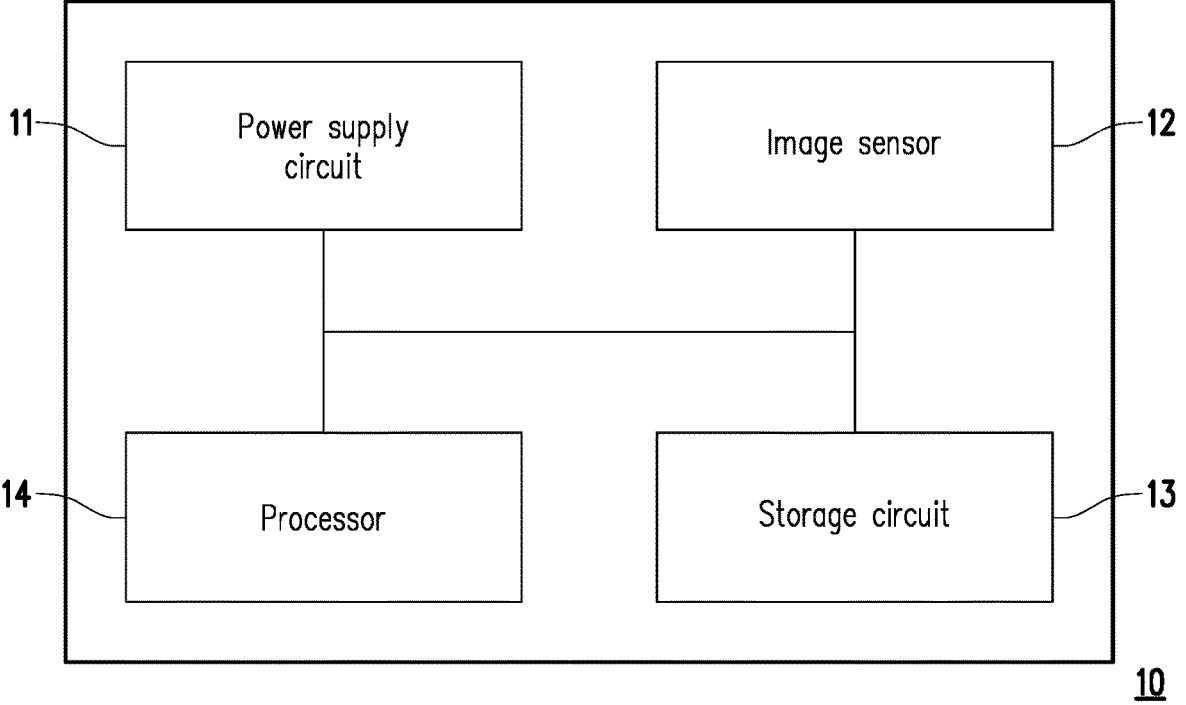
FIG. 1 is a schematic diagram of a device for detecting power stability of an image sensor according to an embodiment of the disclosure.

Referring to FIG. 1, a detection device (also referred to as a power stability detection device of an image sensor) 10 includes a power supply circuit 11, an image sensor 12, a storage circuit 13, and a processor 14. The power supply circuit 11, the image sensor 12, the storage circuit 13, and the processor 14 may be coupled to each other through a system bus or a motherboard. In addition, the detection device 10 may be installed in various electronic devices with image sensors, such as smart phones, tablet computers, notebook computers, desktop computers, or game consoles.

In one embodiment, the power supply circuit 11 is used to provide power to the image sensor 12. The power may be used to drive the image sensor 12. For example, the power supply circuit 11 may include a voltage regulation circuit. The voltage regulation circuit may include various electronic elements such as capacitors, resistors, inductors, and/ or transistors. These electronic elements may be coupled to each other in a suitable manner and used to perform operations such as rectifying, stepping up, stepping down, and/or stabilizing the power provided by the battery or the power supply. Then, the power supply circuit 11 may provide the adjusted power to the image sensor 12 to use the power to drive the image sensor 12. In one embodiment, the power supply circuit 11 may also provide power to the storage circuit 13, the processor 14, and/or other electronic elements or electronic devices inside the detection device 10, which is not limited in this disclosure. It should be noted that those skilled in the art should know how to design the power supply circuit 11 to provide power required by various electronic elements or electronic devices, so details are not repeated herein.

In one embodiment, the image sensor 12 is used to capture images. In particular, the image sensor 12 may receive power from the power supply circuit 11. In one embodiment, the image sensor 12 cannot operate without receiving power from the power supply circuit 11. After receiving the power from the power supply circuit 11, the image sensor 12 may be driven by the power to perform an image capture function. For example, the image sensor 12 may include an image sensing module. The image sensing module may at least include an optical lens and a photosensitive element to support the image capture function.

In one embodiment, the storage circuit 13 is used to store data. The storage circuit 13 includes a volatile storage circuit and a non-volatile storage circuit. The volatile storage circuit is used for volatile storage of data. For example, the volatile storage circuit may include random access memory (RAM) or similar volatile storage media. The non-volatile storage circuit is configured to non-volatilely store data. For example, the non-volatile storage circuit may include read only memory (ROM), solid state disk (SSD), hard disk drive (HDD), flash memory, embedded multimedia card (eMMC), universal flash storage (UFS) device, or similar non-volatile storage media. For example, the storage circuit 13 may be used to store the image captured by the image sensor 12.

In one embodiment, the processor 14 is responsible for the entire or partial operations of the detection device 10. The processor 14 includes a central processing unit (CPU), a graphics processing unit (GPU), or other programmable general-purpose or special-purpose microprocessor, a digital signal processor (DSP), a programmable controller, an application specific integrated circuit (ASIC), a programmable logic device (PLD), or other similar devices, or a combination of these devices. In particular, the processor 14 may be used to detect the power stability of the image sensor 12.

Figure 2:
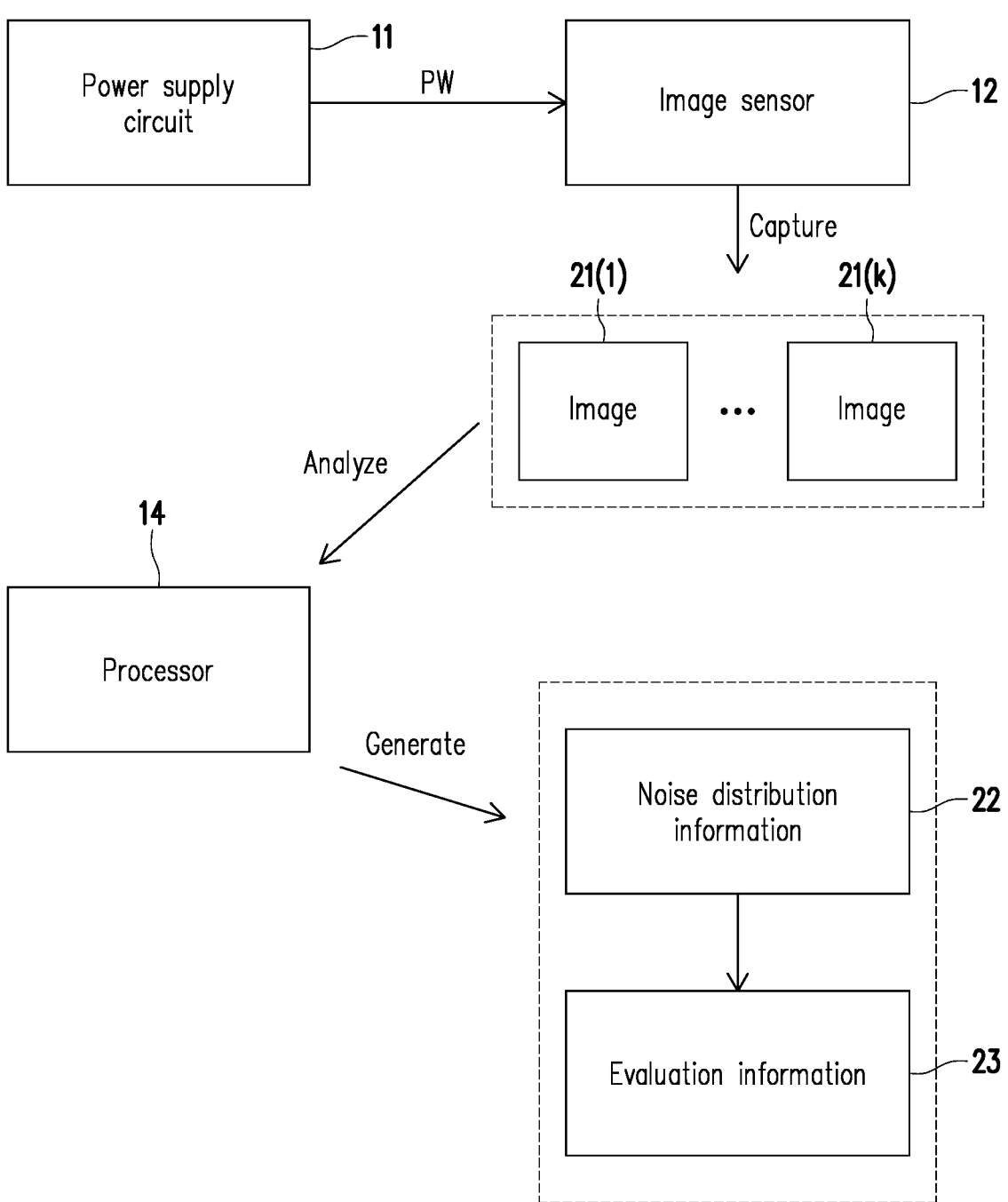
FIG. 2 is a schematic diagram of an operation procedure for detecting power stability of an image sensor according to an embodiment of the disclosure.

Referring to FIG. 2, the power supply circuit 11 may provide power PW to the image sensor 12 based on a specific electronic configuration. The power PW may be used to drive the image sensor 12. For example, the electronic configuration of the power supply circuit 11 may be defined by the configuration modes of various electronic elements such as capacitors, resistors, inductors, and/or transistors disposed inside the power supply circuit 11. In particular, the configuration mode of these electronic elements affects the power PW that is output, for example, the stability of the power PW is affected. That is, in different configuration modes, the stability of the power PW that is output may be different.

In one embodiment, in a configuration mode (also referred to as a first configuration mode) of at least some electronic elements inside the power supply circuit 11, the current electronic configuration of the power supply circuit 11 may be regarded as the first electronic configuration. In addition, in another configuration mode (also referred to as a second configuration mode) of at least some electronic elements inside the power supply circuit 11, the current electronic configuration of the power supply circuit 11 may be regarded as the second electronic configuration. The first configuration mode is different from the second configuration mode, and the first electronic configuration is different from the second electronic configuration. By changing the configuration mode of at least some electronic elements inside the power supply circuit 11, the electronic configuration of the power supply circuit 11 may be changed correspondingly, for example, the electronic configuration of the power supply circuit 11 may be changed from the first electronic configuration to the second electronic configuration.

In one embodiment, the operation of changing the configuration mode of at least some of the electronic elements inside the power supply circuit 11 includes changing the parameter values (e.g., capacitance value, impedance value, etc.) of at least some electronic elements inside the power supply circuit 11 by means of hardware adjustment, removing specific electronic elements, adding specific electronic elements, and/or changing the coupling relationship of specific electronic elements. In one embodiment, the operation of changing the configuration mode of at least some of the electronic elements inside the power supply circuit 11 may also include changing the control parameters of at least some of the electronic elements inside the power supply circuit 11 by means of software or firmware adjustment, which is not limited in this disclosure.

During the period that the image sensor 12 is driven by the power supply PW, the processor 14 may capture images (also referred to as test images) 21(1) to 21($k$) through the image sensor 12. The total number of images 21(1) to 21($k$) may be one or more. The images 21(1) to 21($k$) are all used to present black images. For example, the image sensor 12 may capture images of various shielding objects covered in front of the lens of the image sensor 12 to obtain images 21(1) to 21($k$).

The processor 14 may analyze the image content of the images 21(1) to 21($k$) to obtain the noise distribution information 22 of the images 21(1) to 21($k$). The noise distribution information 22 may reflect the distribution status of the noise in the image content of the images 21(1) to 21($k$). Then, the processor 14 may generate the evaluation information 23 corresponding to the current electronic configuration of the power supply circuit 11 according to the noise distribution information 22. For example, the evaluation information 23 may reflect the stability of the power PW provided by the power supply circuit 11 based on the current electronic configuration. Thereafter, equipment maintenance personnel or engineers may adjust the electronic configuration of the power supply circuit 11 according to the evaluation information 23 to improve the stability of the power PW output by the power supply circuit 11. Once the stability of the power PW is improved, the image quality of the image captured by the image sensor 12 driven by the power PW may also be improved accordingly.

In one embodiment, the processor 14 may respectively convert the images 21(1) to 21($k$) into grayscale images. Then, the processor 14 may obtain the noise distribution information 22 according to the numerical value distribution of multiple pixel values in at least one pixel position set in the grayscale image.

Referring to FIG. 3, it is assumed that the image 31 is one of the images 21(1) to 21($k$) in FIG. 2. The processor 14 may convert the image 31 into an image 32. The image 32 is a grayscale image. For example, each pixel position in image 32 may correspond to a pixel value. For example, the pixel values P(11) to P(1n) are located in the first row of the image 32, the pixel values P(21) to P(2n) are located in the second row of the image 32, and the pixel values P(m1) to P(mn) are located in the mth row in the image 32. In addition, the pixel values P(11) to P(m1) are located in the first column of the image 32, the pixel values P(12) to P(m2) are located in the second column of the image 32, and the pixel values P(1n) to P(mn) are located in the $n^{th}$ column in the image 32. The n and m may be set according to practical requirements, which are not limited in this disclosure.

Each pixel value in the image 32 may range from 0 to 255 to reflect the grayscale value of the pixel position corresponding to the pixel value. For example, assuming that the color of a certain pixel position is darker (i.e., closer to black), the pixel value corresponding to this pixel position is smaller (i.e., closer to 0). Alternatively, assuming that the color of a certain pixel position is lighter (i.e., closer to white), the pixel value corresponding to this pixel position is larger (i.e., closer to 255).

In one embodiment, a pixel position set includes multiple pixel positions located in the same column or row in the image 32. Alternatively, in one embodiment, a pixel position set includes multiple pixel positions located in multiple columns or multiple rows in the image 32.

In one embodiment, the processor 14 may obtain the noise distribution information 22 of FIG. 2 according to the numerical value distribution of multiple pixel values in different pixel position sets in a certain grayscale image (also referred to as the first grayscale image). For example, the different pixel position sets in the first grayscale image may include pixel positions in different rows or different columns in the first grayscale image.

In one embodiment, the noise distribution information 22 in FIG. 2 includes a noise variation evaluation value (also referred to as a first noise variation evaluation value). The processor 14 may obtain a first noise variation evaluation value according to the variation degree of the noise between different pixel position sets in the first grayscale image. From another point of view, the first noise variation evaluation value may reflect the variation degree of noise between different pixel position sets in the first grayscale image (or a single test image).

Figure 4A:
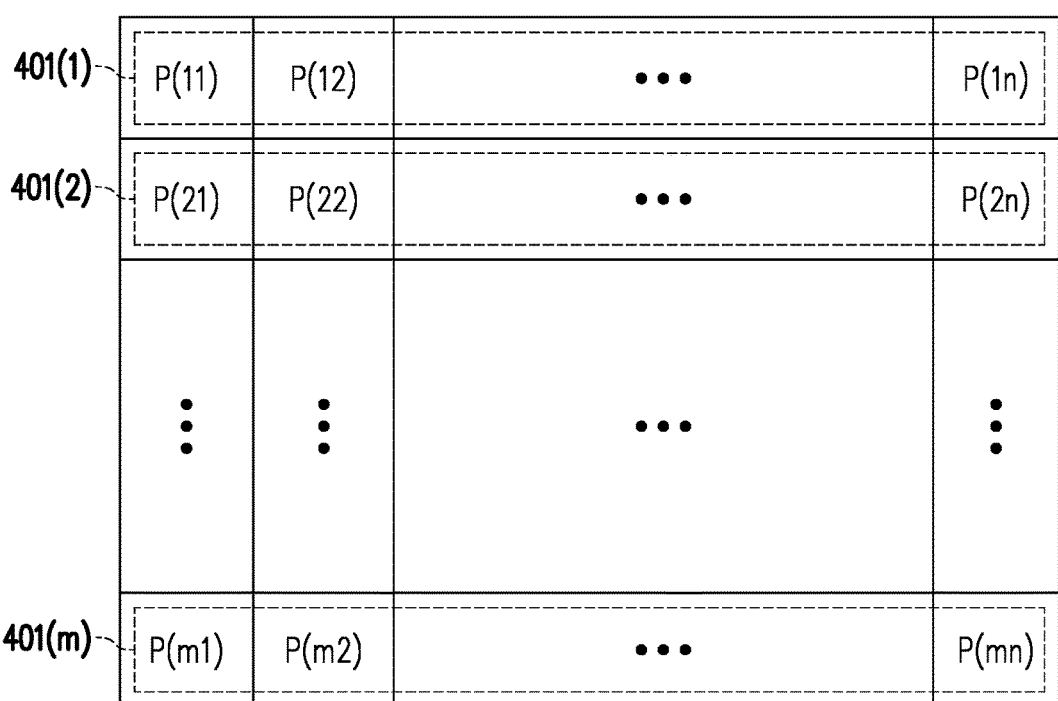
FIG. 4A is a schematic diagram of using different rows in a single grayscale image as multiple pixel position sets according to an embodiment of the disclosure.

Referring to FIG. 4A, in one embodiment, the processor 14 may divide or group each pixel position in the image 32 into one of the pixel position sets 401(1) to 401(m) in units of rows. For example, the pixel position set 401(1) may include pixel values P(11) to P(1n) located in the first row of the image 32, the pixel position set 401(2) may include pixel values P(21) to P(2n) located in the second row of the image 32, and the pixel position set 401(m) may include pixel values P(m1) to P(mn) located in the mth row of the image 32. It should be noted that, in another embodiment, a pixel position set may also include pixel positions located in multiple rows, which is not limited in this disclosure.

In one embodiment, the processor 14 may obtain a logical value (also referred to as the first logical value) corresponding to the pixel position set 401(i) according to the numerical value distribution of the pixel values P(i1) to P(in) in the pixel position set 401(i). For example, the first logical value may reflect an average value of pixel values P(i1) to P(in).

In one embodiment, it is assumed that the average value of the pixel values P(11) to P(1n) in the pixel position set 401(1) is very close to the average value of the pixel values P(21) to P(2n) in the pixel position set 401(2) (i.e., the first logical value corresponding to the pixel position set 401(1) is very close to the first logical value corresponding to the pixel position set 401(2)), indicating that the variation degree of the noise between the pixel position sets 401(1) and 401(2) is small. Alternatively, in one embodiment, it is assumed that the difference between the average value of the pixel values P(11) to P(1n) in the pixel position set 401(1) and the average value of the pixel values P(21) to P(2n) in the pixel position set 401(2) is relatively large (i.e., the difference between the first logical value corresponding to the pixel position set 401(1) and the first logical value corresponding to the pixel position set 401(2) is relatively large), indicating that the variation degree of the noise between the pixel position sets 401(1) and 401(2) is relatively large.

In one embodiment, after obtaining multiple first logical values respectively corresponding to the pixel position sets 401(1) to 401(m), the processor 14 may obtain a first noise variation evaluation value corresponding to the image 32 according to the numerical value distribution of the first logical values. The first noise variation evaluation value may reflect the variation degree of noise between different pixel position sets (i.e., pixel position sets 401(1) to 401(m)) in the image 32.

In one embodiment, the processor 14 may obtain another logical value (also referred to as a second logical value) according to the numerical value distribution of the first logical values. For example, the second logical value may reflect a standard deviation of multiple first logical values. The processor 14 may set the second logical value as the first noise variation evaluation value.

Figure 4B:
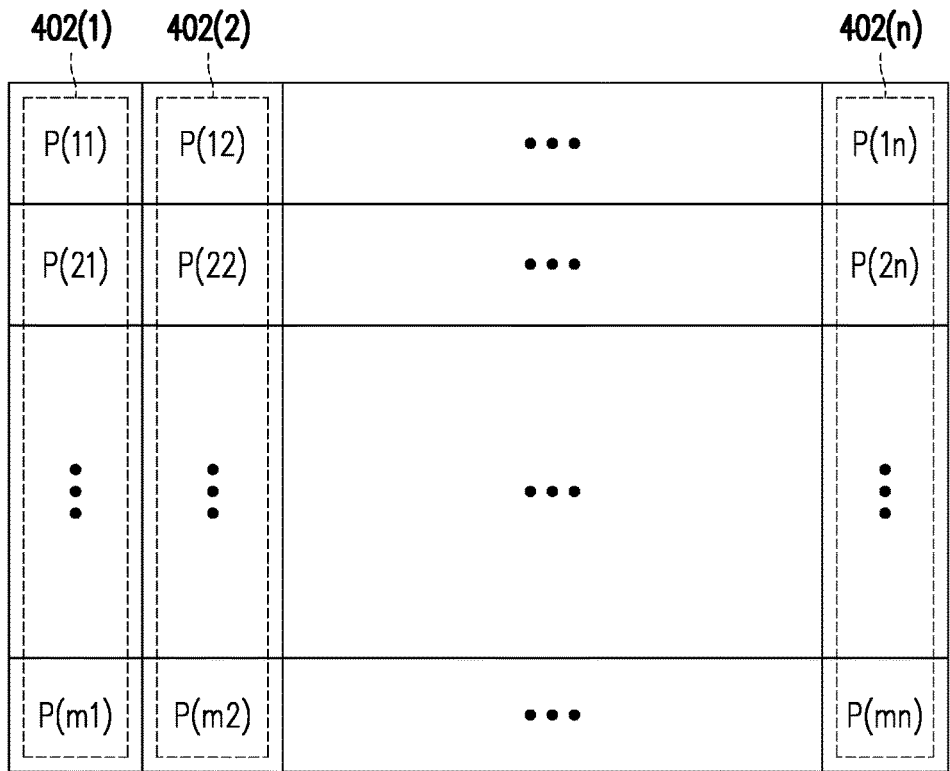
FIG. 4B is a schematic diagram of using different columns in a single grayscale image as multiple pixel position sets according to an embodiment of the disclosure.

Referring to FIG. 4B, in one embodiment, the processor 14 may divide or group each pixel position in the image 32 into one of the pixel position sets 402(1) to 402(n) in units of columns. For example, pixel position set 402(1) may include pixel values P(11) to P(m1) located in the first column in image 32, the pixel position set 402(2) may include pixel values P(12) to P(m2) located in the second column in image 32, and the pixel position set 402(n) may include the pixel values P(1n) to P(mn) located in the $n^{th}$ row of the image 32. It should be noted that, in another embodiment, a pixel position set may also include pixel positions located in multiple columns, which is not limited in this disclosure.

In one embodiment, the processor 14 may obtain a logical value (i.e., the first logical value) corresponding to the pixel position set 402(j) according to the numerical value distribution of the pixel values P(1j) to P(mj) in the pixel position set 402(j). For example, the first logical value may reflect an average value of pixel values P(1j) to P(mj).

In one embodiment, it is assumed that the average value of the pixel values P(11) to P(m1) in the pixel position set 402(1) is very close to or even the same as the average value of the pixel values P(12) to P(m2) in the pixel position set 402(2) (i.e., the first logical value corresponding to the pixel position set 402(1) is very close to or the same as the first logical value corresponding to the pixel position set 402(2)), indicating that the variation degree of the noise between the pixel position sets 402(1) and 402(2) is small. Alternatively, in one embodiment, it is assumed that the difference between the average value of the pixel values P(11) to P(m1) in the pixel position set 402(1) and the average value of the pixel values P(12) to P(m2) in the pixel position set 402(2) is relatively large (i.e., the difference between the first logical value corresponding to the pixel position set 402(1) and the first logical value corresponding to the pixel position set 402(2) is relatively large), indicating that the variation degree of the noise between the pixel position sets 401(1) and 401(2) is relatively large.

In one embodiment, after obtaining multiple first logical values respectively corresponding to the pixel position sets 402(1) to 402(n), the processor 14 may obtain a first noise variation evaluation value corresponding to the image 32 according to the numerical value distribution of the first logical values. The first noise variation evaluation value may reflect the variation degree of noise between different pixel position sets (i.e., pixel position sets 402(1) to 402(n)) in the image 32. For example, the processor 14 may obtain the second logical value according to the numerical value distribution of the first logical values. For example, the second logical value may reflect a standard deviation of multiple first logical values. Then, the processor 14 may set the second logical value as the first noise variation evaluation value.

In an embodiment, the processor 14 may also obtain the noise distribution information 22 in FIG. 2 according to the numerical value distribution of multiple pixel values in the same pixel position set in multiple grayscale images. For example, the grayscale images may include a first grayscale image and another grayscale image (also referred to as a second grayscale image). The same pixel position set in the grayscale images may include multiple pixel positions located in the same column or row in the first grayscale image and the second grayscale image.

In one embodiment, the noise distribution information 22 in FIG. 2 includes another noise variation evaluation value (also referred to as a second noise variation evaluation value). The processor 14 may obtain a second noise variation evaluation value according to the variation degree among the same pixel position set in multiple grayscale images. From another point of view, the second noise variation evaluation value may reflect the variation degree of noise among the same pixel position set in multiple gray scale images (or multiple test images).

Figure 5A:
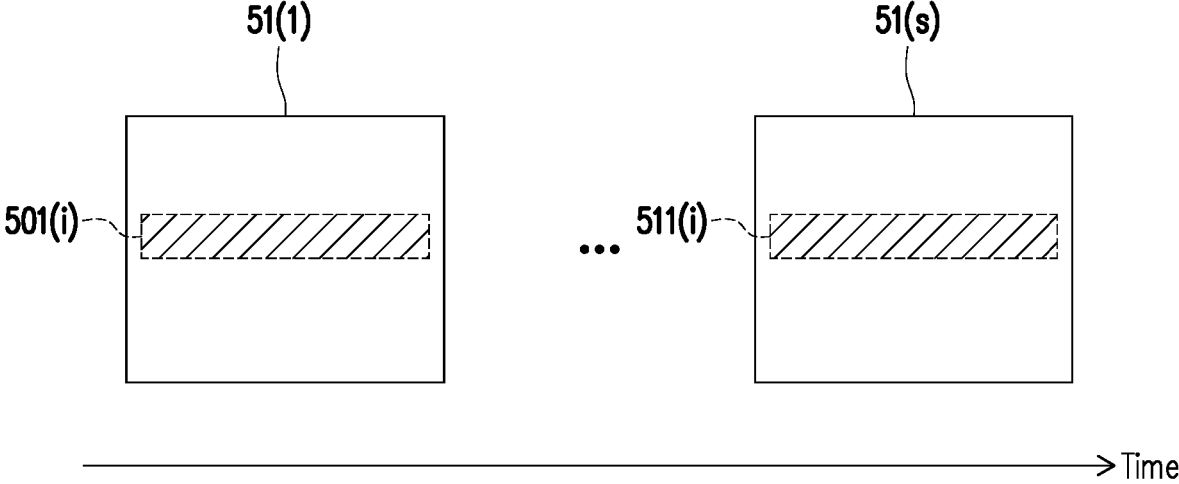
FIG. 5A is a schematic diagram of using the same row in multiple grayscale images as multiple pixel position sets according to an embodiment of the disclosure.

Referring to FIG. 5A, it is assumed that the images 51(1) to 51(s) are all grayscale images. For example, the images 51(1) to 51(s) are generated according to the images (e.g., the images 21(1) to 21(k) in FIG. 2) captured by the image sensor 12 at different time points. In the following, for the convenience of explanation, only the image 51(1) (i.e., the first grayscale image) and the image 51(s) (i.e., the second grayscale image) are taken as an example, the operation of obtaining the second noise variation evaluation value according to the numerical value distribution of multiple pixel values in the same pixel position set in the images 51(1) to 51(s) is described.

In one embodiment, the processor 14 may respectively select pixel position sets 501(i) and 511(i) in the images 51(1) and 51(s). In particular, the pixel position sets 501(i) and 511(i) cover multiple pixel positions in the same row in the images 51(1) and 51(s). For example, the pixel position set 501(i) may include multiple pixel values located in row i in the image 51(1), and the pixel position set 511(i) may include multiple pixel values also located in the row i in the image 51(s). The processor 14 may obtain the second noise variation evaluation value according to the numerical value distribution of multiple pixel values in the pixel position sets 501(i) and 511(i).

In one embodiment, the processor 14 may obtain a logical value (also referred to as the third logical value) corresponding to the pixel position set 501(i) according to the numerical value distribution of multiple pixel values in the pixel position set 501(i). For example, the third logical value corresponding to the pixel position set 501(i) may reflect the average value of the pixel values in the pixel position set 501(i). On the other hand, the processor 14 may obtain a third logical value corresponding to the pixel position set 511(i) according to the numerical value distribution of multiple pixel values in the pixel position set 511(i). For example, the third logical value corresponding to the pixel position set 511(i) may reflect the average value of the pixel values in the pixel position set 511(i).

In one embodiment, after obtaining multiple third logical values respectively corresponding to the pixel position sets 501(i) and 511(i), the processor 14 may obtain a second noise variation evaluation value corresponding to the images

51(1) and 51(s) according to the numerical value distribution of the third logical values. The second noise variation evaluation value may reflect the variation degree of noise between the same pixel position sets (i.e., pixel position sets 501(i) and 511(i)) in the images 51(1) and 51(s).

In one embodiment, the processor 14 may obtain another logical value (also referred to as a fourth logical value) according to the numerical value distribution of the third logical values. For example, the fourth logical value may reflect a standard deviation of the third logical values. The processor 14 may set the fourth logical value as the second noise variation evaluation value.

Figure 5B:
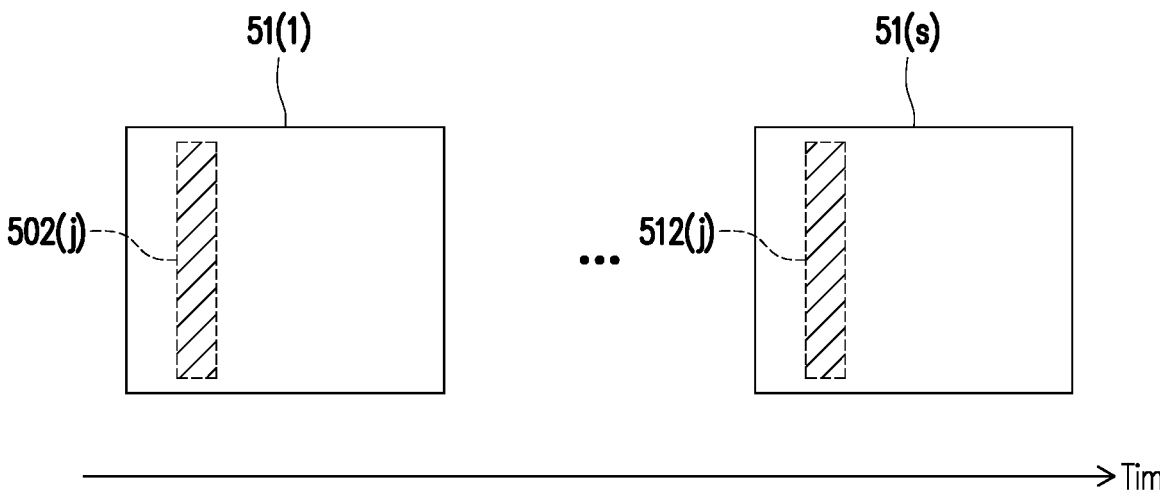
FIG. 5B is a schematic diagram of using the same column in multiple grayscale images as multiple pixel position sets according to an embodiment of the disclosure.

Referring to FIG. 5B, in one embodiment, the processor 14 may respectively select pixel position sets 502(j) and 512(j) in the images 51(1) and 51(s). In particular, the pixel position sets 502(j) and 512(j) cover multiple pixel positions in the same column in the images 51(1) and 51(s). For example, the pixel position set 502(j) may include multiple pixel values located in column j in the image 51(1), and the pixel position set 512(j) may include multiple pixel values also located in the column j in the image 51(s). The processor 14 may obtain the second noise variation evaluation value according to the numerical value distribution of multiple pixel values in the pixel position sets 502(j) and 512(j).

In one embodiment, the processor 14 may obtain a third logical value corresponding to the pixel position set 502(j) according to the numerical value distribution of multiple pixel values in the pixel position set 502(j). For example, the third logical value corresponding to the pixel position set 502(j) may reflect the average value of the pixel values in the pixel position set 502(j). On the other hand, the processor 14 may obtain a third logical value corresponding to the pixel position set 512(j) according to the numerical value distribution of multiple pixel values in the pixel position set 512(j). For example, the third logical value corresponding to the pixel position set 512(j) may reflect the average value of the pixel values in the pixel position set 512(j).

In one embodiment, after obtaining multiple third logical values respectively corresponding to the pixel position sets 502(j) and 512(j), the processor 14 may obtain a second noise variation evaluation value corresponding to the images 51(1) and 51(s) according to the numerical value distribution of the third logical values. The second noise variation evaluation value may reflect the variation degree of noise between the same pixel position sets (i.e., pixel position sets 502(j) and 512(j)) in the images 51(1) and 51(s). For example, the processor 14 may obtain the fourth logical value according to the numerical value distribution of the third logical values. For example, the fourth logical value may reflect a standard deviation of the third logical values. The processor 14 may set the fourth logical value as the second noise variation evaluation value.

In an embodiment, the first noise variation evaluation value may also reflect the variation of noise in a single test image in response to a change in pixel position. Please refer to the embodiment shown in FIG. 4A and FIG. 4B for related description. In addition, the second noise variation evaluation value may also reflect the variation of noise in multiple test images in response to time variation. Please refer to the embodiment shown in FIG. 5A and FIG. 5B for related description.

In one embodiment, the processor 14 may generate the noise distribution information 22 in FIG. 2 according to the first noise variation evaluation value and/or the second noise variation evaluation value. For example, the processor 14 may perform a logical operation on the first noise variation evaluation value and/or the second noise variation evaluation value to obtain another noise variation evaluation value (also referred to as a third noise variation evaluation value). The third noise variation evaluation value may reflect the overall scattering degree or the overall variation degree of the noise in the images 21(1) to 21(k). For example, the third noise variation evaluation value may be positively correlated with the first noise variation evaluation value and/or the second noise variation evaluation value. Then, the processor 14 may generate the noise distribution information 22 according to the third noise variation evaluation value. In one embodiment, the noise distribution information 22 includes at least one of the first noise variation evaluation value, the second noise variation evaluation value, and the third noise variation evaluation value.

In one embodiment, the processor 14 may convert the noise distribution information 22 into the evaluation information 23 by through a look-up table or real-time calculation. For example, the processor 14 may input at least one of the first noise variation evaluation value, the second noise variation evaluation value, and the third noise variation evaluation value in the noise distribution information 22 into a look-up table or an analysis model. The analysis model may include a numerical analysis model or an artificial intelligence model. Then, the processor 14 may obtain the evaluation information 23 according to the output of the look-up table or the analysis model. The evaluation information 23 may be used to provide evaluation information related to the stability of the power PW output by the power supply circuit 11. In one embodiment, the evaluation information 23 further provides adjustment suggestions related to the electronic configuration of the power supply circuit 11. Thereafter, equipment maintenance personnel or engineers may adjust the electronic configuration of the power supply circuit 11 according to the evaluation information 23 to improve the stability of the power PW output by the power supply circuit 11. Once the stability of the power PW is improved, the image quality of the image captured by the image sensor 12 driven by the power PW may be improved accordingly.

In one embodiment, assuming that the current electronic configuration of the power supply circuit 11 is the first electronic configuration, during the period that the image sensor 12 is driven by the power PW (also referred to as the first power), the processor 14 may capture at least one test image (also referred to as the first test image) through the image sensor 12. The processor 14 may analyze the image content of the first test image to obtain noise distribution information (also referred to as the first noise distribution information) of the first test image. Then, the processor 14 may generate evaluation information (also referred to as the first evaluation information) corresponding to the first electronic configuration according to the first noise distribution information. In particular, the first evaluation information may reflect the stability of the power PW (i.e., the first power) provided by the power supply circuit 11 based on the first electronic configuration.

In one embodiment, assuming that the current electronic configuration of the power supply circuit 11 is adjusted from the first electronic configuration to the second electronic configuration, during the period that the image sensor 12 is driven by the power PW (also referred to as the second power), the processor 14 may capture at least one test image (also referred to as the second test image) through the image sensor 12. The processor 14 may analyze the image content of the second test image to obtain noise distribution information (also referred to as the second noise distribution information) of the second test image. Then, the processor 14 may generate evaluation information (also referred to as the second evaluation information) corresponding to the second electronic configuration according to the second noise distribution information. In particular, the second evaluation information may reflect the stability of the power PW (i.e., the second power) provided by the power supply circuit 11 based on the second electronic configuration.

In one embodiment, the processor 14 compares the first evaluation information with the second evaluation information. According to the comparison result, the processor 14 generates another evaluation information (also referred to as the third evaluation information). The third evaluation information reflects that the stability of one of the first power and the second power is higher than the stability of the other one of the first power and the second power. For example, assuming that the comparison result of the first evaluation information and the second evaluation information reflects that the stability of the second power is higher than that of the first power, the processor 14 may output the comparison result in the form of a report or the like through the third evaluation information. Thereafter, equipment maintenance personnel or engineers may adjust the electronic configuration of the power supply circuit 11 to the second electronic configuration (or other electronic configurations) according to the third evaluation information, so as to optimize the stability of the power PW output by the power supply circuit 11.

Figure 6:
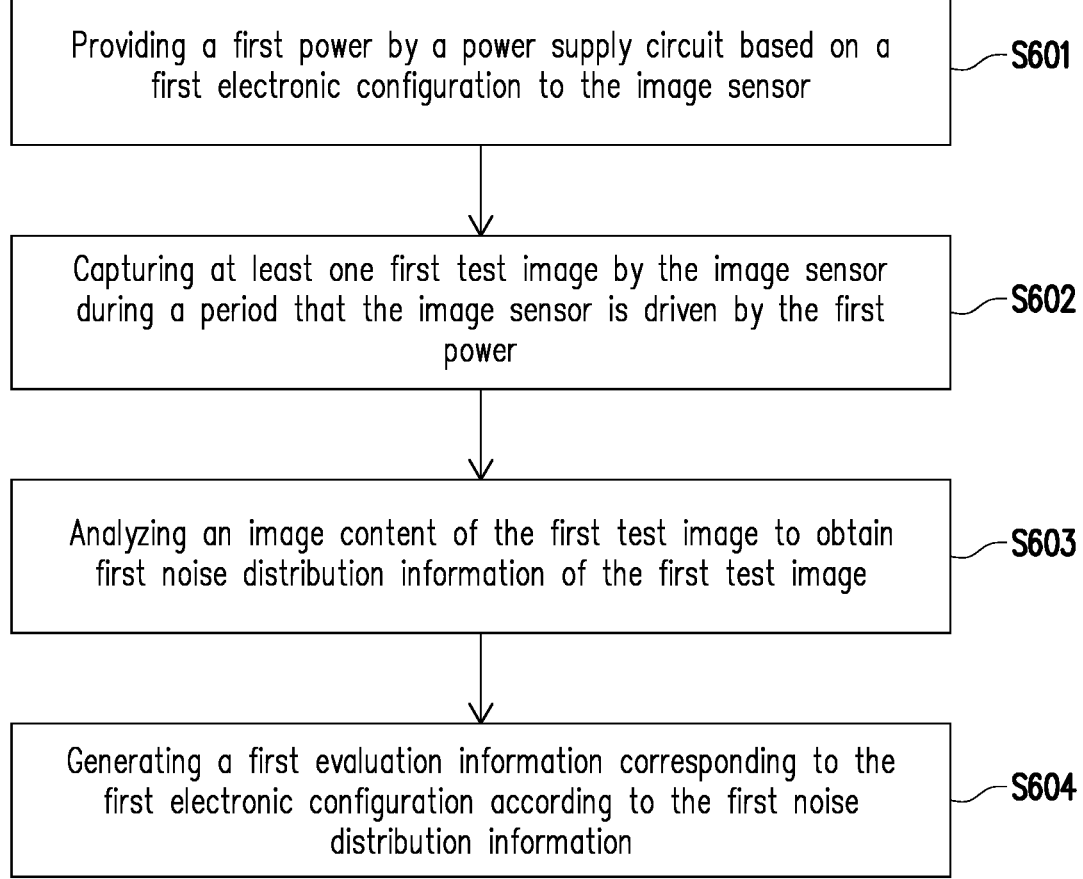
FIG. 6 is a flowchart of a method for detecting power stability of an image sensor according to an embodiment of the disclosure.

Referring to FIG. 6, in step S601, the power supply circuit provides a first power to the image sensor based on a first electronic configuration. In step S602, at least one first test image is captured through the image sensor during a period that the image sensor is driven by the first power. In step S603, image content of the first test image is analyzed to obtain first noise distribution information of the first test image. In step S604, the evaluation information corresponding to the first electronic configuration is generated according to the first noise distribution information.

However, each step in FIG. 6 has been described in detail as above, and are not repeated herein. It should be noted that each of the steps in FIG. 6 may be implemented as multiple program codes or circuits, and the disclosure is not limited thereto. In addition, the method in FIG. 6 may be used in conjunction with the above-mentioned exemplary embodiments, or may be used alone, and the disclosure is not limited thereto.

To sum up, compared to conventional manual detection of power stability to the image sensor by maintenance personnel or engineers, in this disclosure, by automatically analyzing the test images generated by the image sensor and generating relevant evaluation information, the efficiency of stability detection of the power output by the power supply circuit may be effectively improved. In addition, the detection efficiency of the power stability may be effectively improved through the mutual matching of detection behaviors for a single test image and multiple test images.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A method for detecting power stability of an image sensor, comprising:

providing first power by a power supply circuit to the image sensor based on a first electronic configuration;

capturing at least one first test image by the image sensor during a period that the image sensor is driven by the first power;

analyzing image content of the at least one first test image to obtain first noise distribution information of the at least one first test image, comprising:

converting the at least one first test image into at least one grayscale image; and obtaining the first noise distribution information according to a numerical value distribution of a plurality of pixel values in at least one pixel position set in the at least one grayscale image; and generating first evaluation information corresponding to the first electronic configuration according to the first noise distribution information.

2. The method for detecting power stability of the image sensor according to claim 1, wherein the at least one grayscale image comprises a first grayscale image, and obtaining the first noise distribution information according to the numerical value distribution of the pixel values in the at least one pixel position set in the at least one grayscale image comprises:

obtaining the first noise distribution information according to a numerical value distribution of a plurality of pixel values in different pixel position sets in the first grayscale image.

3. The method for detecting power stability of the image sensor according to claim 1, wherein the at least one grayscale image comprises a first grayscale image and a second grayscale image, and obtaining the first noise distribution information according to the numerical value distribution of the pixel values in the at least one pixel position set in the at least one grayscale image comprises:

obtaining the first noise distribution information according to numerical value distributions of a plurality of pixel values in a same pixel position set in the first grayscale image and the second grayscale image.

4. The method for detecting power stability of the image sensor according to claim 1, wherein a pixel position set in the at least one of pixel position set comprises a plurality of pixel positions located in a same column or a same row in a grayscale image in the at least one grayscale image.

5. The method for detecting power stability of the image sensor according to claim 1, wherein the first noise distribution information comprises a first noise variation evaluation value, and the first noise variation evaluation value reflects a variation degree of noise among different pixel position sets in a single test image.

6. The method for detecting power stability of the image sensor according to claim 1, wherein the first noise distribution information comprises a second noise variation evaluation value, and the second noise variation evaluation value reflects a variation degree of noise among a same pixel position set in a plurality of test images.

7. The method for detecting power stability of the image sensor according to claim 1, wherein the first evaluation information reflects stability of the first power provided by the power supply circuit based on the first electronic configuration.

8. The method for detecting power stability of the image sensor according to claim 1, further comprising:

providing second power by the power supply circuit to the image sensor based on a second electronic configuration, the first electronic configuration being different from the second electronic configuration;

capturing at least one second test image by the image sensor during a period that the image sensor is driven by the second power;

analyzing image content of the at least one second test image to obtain second noise distribution information of the at least one second test image; and generating second evaluation information corresponding to the second electronic configuration according to the second noise distribution information.

9. The method for detecting power stability of the image sensor according to claim 8, further comprising:

comparing the first evaluation information with the second evaluation information; and generating third evaluation information based on a comparison result, wherein the third evaluation information reflects that stability of one of the first power and the second power is higher than stability of another one of the first power and the second power.

10. A device for detecting power stability of an image sensor, comprising:

a power supply circuit;

an image sensor, coupled to the power supply circuit; and a processor, coupled to the image sensor, wherein the power supply circuit is used to provide first power to the image sensor based on a first electronic configuration, and the processor is used to:

capture at least one first test image by the image sensor during a period that the image sensor is driven by the first power;

analyze image content of the at least one first test image to obtain first noise distribution information of the at least one first test image, wherein the first noise distribution information comprises a first noise variation evaluation value, and the first noise variation evaluation value reflects a variation degree of noise among different pixel position sets in a single test image; and generate first evaluation information corresponding to the first electronic configuration according to the first noise distribution information.

11. The device for detecting power stability of the image sensor according to claim 10, wherein the processor analyzing the image content of the at least one first test image to obtain the first noise distribution information of the at least one first test image comprises:

converting the at least one first test image into at least one grayscale image; and obtaining the first noise distribution information according to a numerical value distribution of a plurality of pixel values in at least one pixel position set in the at least one grayscale image.

12. The device for detecting power stability of the image sensor according to claim 11, wherein the at least one grayscale image comprises a first grayscale image, and the processor obtaining the first noise distribution information according to the numerical value distribution of the pixel values in the at least one pixel position set in the at least one grayscale image comprises:

obtaining the first noise distribution information according to a numerical value distribution of a plurality of pixel values in different pixel position sets in the first grayscale image.

13. The device for detecting power stability of the image sensor according to claim 11, wherein the at least one grayscale image comprises a first grayscale image and a second grayscale image, and the processor obtaining the first noise distribution information according to the numerical value distribution of the pixel values in the at least one pixel position set in the at least one grayscale image comprises:

obtaining the first noise distribution information according to numerical value distributions of a plurality of pixel values in a same pixel position set in the first grayscale image and the second grayscale image.

14. The device for detecting power stability of the image sensor according to claim 11, wherein a pixel position set in the at least one of pixel position set comprises a plurality of pixel positions located in a same column or a same row in a grayscale image in the at least one grayscale image.

15. The device for detecting power stability of the image sensor according to claim 10, wherein the first noise distribution information comprises a second noise variation evaluation value, and the second noise variation evaluation value reflects a variation degree of noise among a same pixel position set in a plurality of test images.

16. The device for detecting power stability of the image sensor according to claim 10, wherein the first evaluation information reflects stability of the first power provided by the power supply circuit based on the first electronic configuration.

17. The device for detecting power stability of the image sensor according to claim 10, wherein the power supply circuit is further used to provide a second power to the image sensor based on a second electronic configuration, the first electronic configuration being different from the second electronic configuratio, and the processor is further used to:

capture at least one second test image by the image sensor during a period that the image sensor is driven by the second power;

analyze image content of the at least one second test image to obtain second noise distribution information of the at least one second test image; and generate second evaluation information corresponding to the second electronic configuration according to the second noise distribution information.

18. The device for detecting power stability of the image sensor according to claim 17, wherein the processor is further used to:

comparing the first evaluation information with the second evaluation information; and generating third evaluation information based on a comparison result, wherein the third evaluation information reflects that stability of one of the first power and the second power is higher than stability of another one of the first power and the second power.

* * * * *